United States Patent [19]

Brooks

[11] Patent Number: 4,696,378
[45] Date of Patent: Sep. 29, 1987

[54] AXIALLY COMPACT BRAKE
[75] Inventor: Edward Brooks, Fridley, Minn.
[73] Assignee: Houton Manufacturing Co., Inc., Minneapolis, Minn.
[21] Appl. No.: 737,160
[22] Filed: May 23, 1985
[51] Int. Cl.$^4$ ............................................. F16D 65/24
[52] U.S. Cl. .................................. 188/170; 188/72.1; 188/366; 192/91 R
[58] Field of Search ..................... 188/170, 72.1, 72.6, 188/366, 367; 192/70.27, 91 R, 91 A

[56] References Cited

U.S. PATENT DOCUMENTS

| | | | |
|---|---|---|---|
| 2,721,279 | 10/1955 | Wendel | 310/76 |
| 3,500,970 | 3/1970 | Schilling | 188/170 |
| 3,688,877 | 9/1972 | Day | 188/166 |
| 3,893,556 | 7/1975 | Lech, Jr. et al. | 188/176 |
| 4,057,297 | 11/1977 | Beck et al. | 188/170 |
| 4,078,637 | 3/1978 | Hanks | 188/170 |
| 4,187,931 | 2/1980 | Balzer | 188/72.1 |
| 4,279,330 | 7/1981 | Pottorff et al. | 188/170 |
| 4,470,487 | 9/1984 | Blatt | 188/170 |
| 4,483,422 | 11/1984 | Cory | 188/170 |
| 4,534,454 | 8/1985 | Brooks | 192/18 A |

FOREIGN PATENT DOCUMENTS

| | | |
|---|---|---|
| 0066424 | 12/1982 | European Pat. Off. . |
| 0146783 | 7/1985 | European Pat. Off. . |
| 0176204 | 4/1986 | European Pat. Off. . |
| 2415750 | 8/1979 | France . |

Primary Examiner—George E. A. Halvosa
Assistant Examiner—Matthew C. Graham
Attorney, Agent, or Firm—Peterson, Wicks, Nemer & Kamrath

[57] ABSTRACT

An axially compact brake is disclosed according to the teachings of the present invention as being spring engaged and fluid released for rotationally controlling an electric motor shaft for driving a machine, robot, or other apparatus component. The brake includes a housing formed by an air-chamber housing portion and an annular plate. The air-chamber housing portion includes a friction interface disc and an axial cylindrical member for reciprocally receiving an annular piston to form a fluid pressure cylinder. The annular plate is secured to the cylindrical member and includes torque pins extending into the piston. Coil springs extend axially between the annular plate and the piston. The housing portion has a square outer perimeter defining mounting pads at its corners for sandwiching the housing between the apparatus component and the motor. The brake further includes an input hub having a hexagonal outer cross sectional surface for the slidable receipt of a friction disc capturable between the friction interface disc and the piston. The input hub is supported and rotationally mounted within the housing by the motor shaft and independent of the housing. Thus, the brake is axially short and compact allowing the motor to be mounted closely adjacent to the apparatus component. Additionally, the brake of the present invention can be easily and economically manufactured and assembled.

16 Claims, 3 Drawing Figures

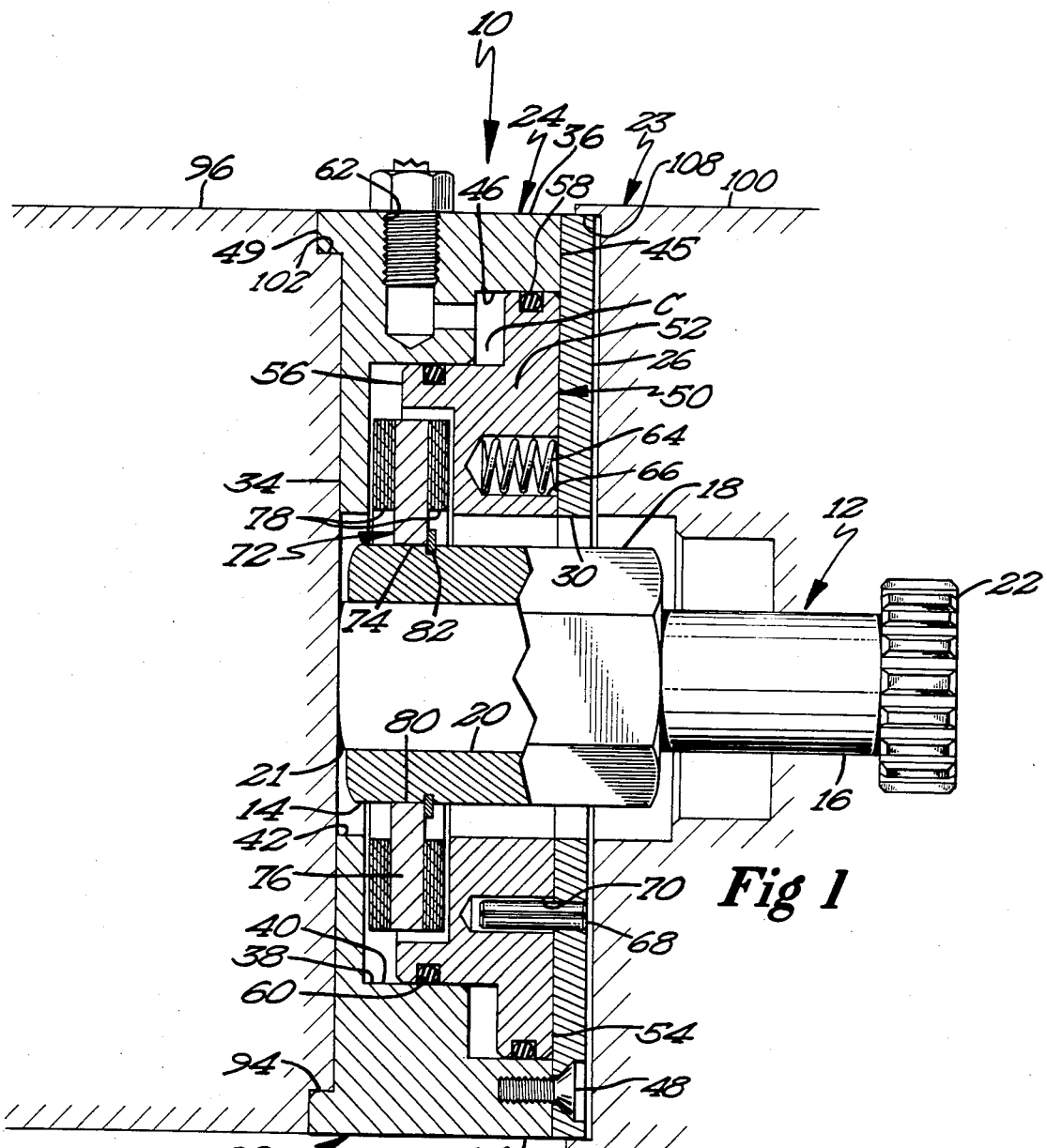
Fig 1
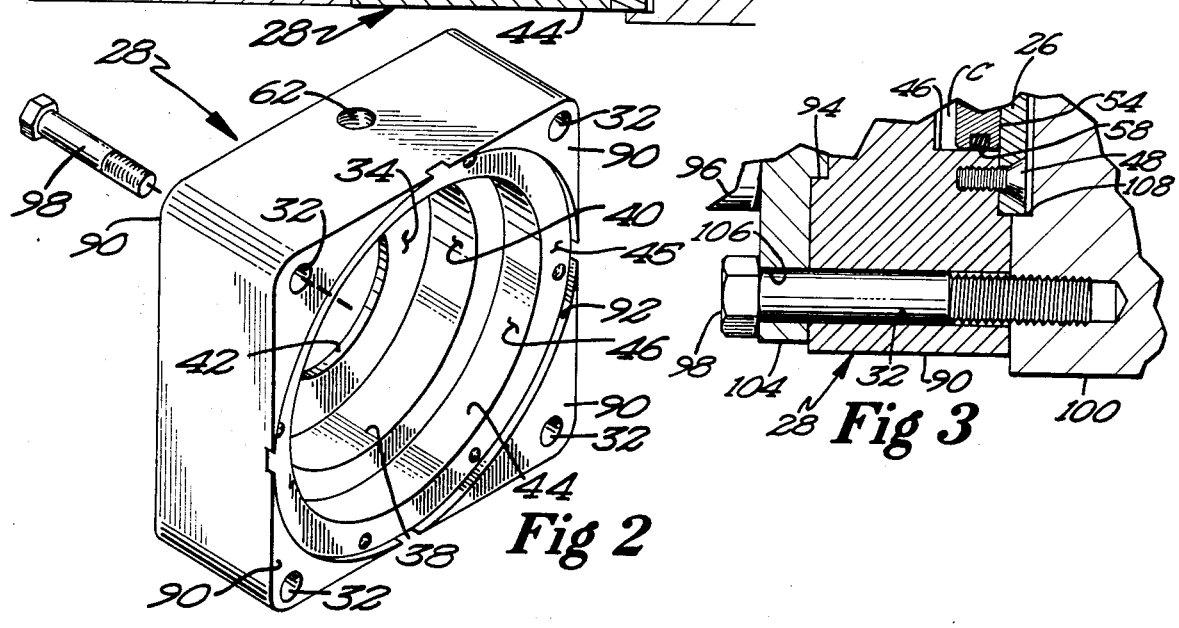
Fig 2
Fig 3

AXIALLY COMPACT BRAKE

BACKGROUND

The present invention generally relates to rotational control apparatus, particularly to brakes, and specifically to axially compact brakes.

It is a continuous problem to allow the source of power to be mounted closely adjacent to the apparatus to be driven while providing rotational control between the power source and the apparatus. For example, in many environments, such as in robotics, the addition of rotational controls intermediate the power source and the apparatus greatly increases the overall size and weight of the particular drive train and in turn increases proportionally the overall size and weight of the total device. This increased size and weight may be very undesirable as to the speed of operation due to the increased mass, as to wear and breakdown, and as to other operational and space requirements.

A major reason for the increased size was due to the large axial length required for rotational control apparatus. Thus, a need has arisen for a rotational control apparatus which is axially compact and allows the power source to be located adjacent to the driven apparatus component.

SUMMARY

The present invention solves these and other needs and problems by providing an axially compact brake including an air-chamber housing portion, a piston, and an interface member. The housing portion slidably receives an annular piston forming and defining a fluid pressure cylinder for the receipt of fluid pressure for moving the piston in a first axial direction. The piston is biased in the opposite axial direction. The brake further includes an input hub attached to and supported by the shaft of a power source and independent of the air-chamber housing portion. The housing portion is sandwiched between the machine, robot or other apparatus component being controlled and the power source and is mounted independent of the input hub. The independence of the input hub and the air-chamber housing portion from each other is one feature of the present invention which permits the brake to be axially compact allowing the machine, robot or other apparatus component to be located closely adjacent to the power source and preventing a significant increase in the stress load placed upon the shaft of the power source due to its support of the input hub.

Thus, it is an object of the present invention to provide a novel brake.

It is further an object of the present invention to provide a novel spring engaged fluid released brake.

It is further an object of the present invention to provide such a novel brake which is axially short and compact.

It is further an object of the present invention to provide such a novel brake allowing the machine, robot, or other driven component to be located closely adjacent to the power source.

It is further an object of the present invention to provide such a novel brake which can be easily and economically manufactured and assembled.

It is further an object of the present invention to provide such a novel brake which utilizes relatively few, non-standard, stock parts.

It is further an object of the present invention to provide such a novel brake allowing the independent mounting of the input hub and the housing from each other.

It is further an object of the present invention to provide such a novel brake which does not include direct rotational support between the input hub and the housing.

It is further an object of the present invention to provide such a novel brake wherein the input hub is rotated and supported by the power source shaft without the harmful increase of torque loading of the shaft bearings or other rotational support of the power source.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a cross sectional view of an axially compact brake according to the preferred embodiment of the teachings of the present invention.

FIG. 2 shows an exploded perspective view of selected components of the axially compact brake of FIG. 1.

FIG. 3 shows a partial, cross sectional view of the axially compact brake of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "axial", "radial", and similar terms are used herein, it should be understood that these terms have reference only to the structure shown in the drawings as it would appear to a person viewing the drawings and are utilized only to facilitate describing the invention.

DESCRIPTION

A rotational control apparatus according to the preferred embodiment of the present invention is shown in the drawings as a spring engaged fluid released brake and is generally designated 10. Brake 10 is shown in its most preferred form for rotationally controlling an input 12 shown in its most preferred form as a hub. Hub 12 generally includes a first axial portion 14 and a second axial portion 16. Portion 14 has a generally hexagonal cross sectional outer surface 18 and an internal, axially extending bore 20 for receipt of a shaft 21 of a power source in a nonrotatable manner. In the most preferred form, brake 10 is utilized with an electric motor 96, with shaft 21 being part of motor 96. Portion 16 includes a pinion gear 22 for interrelation with suitable gearing of a machine, robot, or other apparatus component 23. In its most preferred form, input 12 is rotatably supported by shaft 21 and thus is piloted on the bearing of motor 96 for shaft 21. Input hub 12 is further rotatably supported by the machine 23 to which pinion gear 22 is in gearing relation.

Brake 10 further includes a housing 23 shown in its most preferred form as including a plate 26 and an air-chamber housing portion 28. Air-chamber housing portion 28 in its most preferred form has a square cross sectional outer surface and includes a radially oriented, annular disc 34 and a generally axially extending, cylindrical member 36 extending from a first face of disc 34. Member 36 includes a first annular portion 38 adjacent to disc 34 having an interior cylindrical surface 40 having a diameter which is greater than the diameter of aperture 42 of disc 34. Member 36 further includes a second annular portion 44 integral with portion 38 having an interior cylindrical surface 46 having a diameter which is greater than the diameter of surface 40 of portion 38. Annular portion 44 terminates in a radial surface 45 having an outer diameter generally equal to and in its most preferred form slightly larger than the length of the sides of housing portion 28. In its most preferred form, mounting pads 90 are defined by the corners of portion 28 which extend beyond surface 45. Axially extending mounting apertures 32 in the most preferred form are located in mounting pads 90 of housing portion 28. Additionally, in the most preferred form, pads 90 extend axially beyond surface 45 a distance generally equal to one half the thickness of plate 26. Thus, pads 90 include an interior cylindrical surface 92 having a diameter generally equal to the diameter of surface 45 and to the length of the sides of housing portion 28, and in its most preferred form having a diameter slightly larger than the length of the sides of housing portion 28.

Plate 26 in its most preferred form is circular in shape and has a centrally located aperture 30 through which hub 12 passes. Plate 26 has an outer diameter generally equal to the length of the sides of the housing portion 28, to the diameter of surface 46, and to the diameter of surface 92. Thus, plate 26 may be received in the recess defined by surface 92 of pads 90 of housing portion 28 and may abut with surface 45 of portion 44 of housing portion 28. It should then be appreciated that due to the relationship of the recess and plate 26, plate 26 located in the recess extends beyond the axial end surfaces of pads 90 a distance generally equal to approximately one half its thickness. In its most preferred form, plate 26 is secured to air-chamber housing portion 28 by bolts 48 which extend through apertures formed adjacent to the periphery of plate 26 and which are threadably received in portion 44 of housing 28.

In its most preferred form, air-chamber housing portion 28 further includes a lip 49 forming a pilot rabbet motor mount having an interior cylindrical surface 94 which extends axially from the opposite face of disc 34 than member 36. The casing of motor 96 includes a matching lip 102 such that lip 49 forms a female mount for receipt of the lip 102 of motor 96. It can then be realized that lip 49 insures that housing portion 28 is centrally and concentrically located on motor 96 to locate shaft 21 centrally within aperture 30 of housing portion 28. The casing of the motor 96 further includes mounting flanges 104 having apertures 106 extending axially therethrough. It should then be appreciated that mounting pads 90 and apertures 32 of housing 24 correspond to and are complementary to flanges 104 and apertures 106 of motor 96.

In the most preferred form, base plate 100 of machine 23 includes at least a first cylindrical recess 108 having a diameter generally equal to and for receipt of annular plate 26 and having an axial depth slightly larger than one half the thickness of plate 26. Housing 24 may then be sandwiched between the machine, robot or other apparatus component 23 and the motor 96. In the most preferred form, bolts 98 extend through apertures 106 of flanges 104 and apertures 32 of pads 90 of housing portion 28 and are threadably received in base plate 100 of machine 23.

It can then be appreciated that bolts 98 mount motor 96 to machine 23, mount housing 24 to machine 23, and sandwich housing 24 between motor 96 and machine 23. Furthermore, due to the preferred construction of housing 24 and its interrelationship with machine 23 and motor 96, an interlocking and location-insuring relation is obtained therebetween. Specifically, it can be appreciated that plate 26 of housing 24 is received in recess 108 of base plate 100 of machine 23 and that mounting pads 90 of housing 24 abut with base plate 100 of machine 23 radially outward from recess 108. The receipt of plate 26 inside recess 108 insures that housing 24 is centrally and concentrically located within recess 108 of machine 23 and prevents radial movement between housing 24 and machine 23. The abutment of pads 90 with base plate 100 provides a strong abutment relationship between housing 24 and machine 23 to prevent axial movement of housing 24 in a direction towards machine 23 and provides a strong interconnection with bolts 98 and flanges 104 to prevent axial movement of machine 23, housing 24, and motor 96.

Additionally, it can be appreciated that lip 102 of motor 96 is received within surface 94 of lip 49 of housing 24 and abuts with disc 34 of housing portion 28, that the axial end of lip 49 abuts with the casing of motor 96, and that mounting pads 90 of housing 24 abut with mounting flanges 104 of motor 96. The receipt of lip 102 of motor 96 inside surface 94 insures that housing 24 is centrally and concentrically located on lip 102 and prevents radial movement between housing 24 and motor 96. The abutment of lip 102 with disc 34, lip 49 with motor 96, and pads 90 with flanges 104 provides a strong abutment relationship between housing 24 and motor 96 to prevent axial movement of housing 24 in a direction towards motor 96 and provides a strong interconnection with bolts 98 to prevent axial movement of machine 23, housing 24, and motor 96.

Furthermore, it can be appreciated that since housing 24 is centrally and concentrically located with respect to both machine 23 and motor 96, housing 24 centrally and concentrically locates machine 23 with respect to motor 96. Additionally, housing 24 and bolts 98 mount motor 96 onto machine 23 for sole support thereby, with housing 24 being sandwiched between machine 23 and motor 96. Thus, it can be appreciated that housing 24 and motor 96 do not require any other types of support therefor aside from bolts 98.

Further, the abutment of the casing of motor 96 with disc 34 of housing 24 reinforces disc 34 against axial movement, displacement, and deformation caused by the interfacing of a friction disc or similar interface with disc 34.

Brake 10 further includes a piston 50 shown in its preferred form as including an annular portion 52, a radially extending annular flange 54 extending from the radial outward corner of portion 52 adjacent to plate 26, and an axially extending annular flange 56 extending from the opposite, radial outward corner of portion 52 than flange 54. The free end of flange 54 has a diameter complementary to and for slidable receipt within surface 46 of portion 44. Suitable sealing means 58 such as an O-ring can be provided between flange 54 and portion 44. The outside, axially extending surface of flange 56 has a diameter complementary to and for slidable receipt within surface 40 of portion 38. Suitable sealing means 60 such as an O-ring can be provided between flange 56 and portion 40. It can then be appreciated that a fluid pressure cylinder C is formed and defined by air-chamber housing portion 28 and piston 50. Provision 62 is provided for the introduction of fluid pressure into cylinder C for moving piston 50 in a first axial direction and in its most preferred form in a direction towards anchor plate 26 and away from disc 34 of housing portion 28. Provisions 64 for biasing piston 50 in the opposite axial direction and in its most preferred form in a direction towards disc 34 and away from plate 26 are provided for moving piston 50 in the opposite axial direction. In its most preferred form, provisions 64 are shown as springs which are received in axially extending recesses 66 formed in portion 52 of piston 50 and which abut with plate 26. Brake 10 further includes provisions 68 for slidably mounting piston relative to housing 24 and for preventing relative rotation therebetween. In its most preferred form, provisions 68 are shown as torque pins which extend from plate 26 and which are slidably received in axially extending bores 70 formed in portion 52 of piston 50 in a radially spaced manner from recesses 66.

Brake 10 further includes provisions 72 for interfacing between input 12 and housing 24. In its most preferred form, provisions 72 include a slidable, multiface friction disc 74 having a friction plate 76 which is sandwiched between a pair of friction linings 78. Friction plate 76 is annular in shape and has an aperture 80 having a hexagonal shape which is complementary to and for slidable receipt on surface 18 of portion 14 of hub 12. It can then be realized that the hexagonal shape of aperture 80 of friction disc 74 and of surface 18 of hub 12 prevents relative rotation of friction disc 74 with respect to hub 12 while allowing friction disc 74 to slide on hub 12. Thus, the hexagonal shapes of aperture 80 and hub 12 function in the manner as splined connection therebetween but is considerably easier and more economical to manufacture than splined type connections.

In its most preferred form, a retaining ring 82 received in a cavity formed in surface 18 of hub 12 is provided for preventing movement of friction disc 74 therebeyond. Specifically, retaining ring 82 is provided between piston 50 and friction disc 74 to prevent friction disc 74 from sliding into piston 50 when piston 50 is moved by the introduction of fluid pressure against the bias of springs 64 and to balance gravity acting on friction disc 74 when brake 10 is in a vertical orientation. Thus, brake 10 according to the teachings of the present invention has a universal orientation such that hub 12 can be pivoted horizontally, vertically, or at any angle thereto and friction disc 74 is maintained at a gap from piston 50 for proper disengagement of brake 10.

In operation of the preferred embodiment shown, in the absence of the introduction of fluid pressure through provision 62, springs 64 bias piston 50 such that friction disc 74 is captured between disc 34 of housing 24 and radial surface 84 of portion 52 of piston 50 opposite plate 26. Thus, input 12 is rotatably related to housing 24 by provisions 72 and in its most preferred form is braked when housing 24 is stationary. With the introduction of fluid pressure through provision 62, piston 50 moves against the bias of springs 64 such that friction disc 74 is not captured between disc 34 of housing 24 and surface 84 of portion 52 of piston 50 such that mutual rotation is allowed between housing 24 and input 12.

A further subtle feature of brake 10 according to the teachings of the present invention can now be appreciated. Specifically, brake 10 and motor 96 are mounted to and solely supported to machine 23, with housing 24 being sandwiched between motor 96 and machine 23 for support thereby and independent of hub 12 and with hub 12 uniquely supported by machine 23 and motor 96 and not in any way rotationally supported by housing 24 but independent therefrom. Particularly, hub 12 is attached to and supported by shaft 21 of motor 96 and is further supported by the gearing relation of gear 22 within machine 23. Thus, brake 10 is extremely axially short and compact. It can then be realized that prior control apparatus including bearings or other rotatable mounting means between the housing and the input hub to be controlled requires the apparatus to have an increased axial length to accomodate the bearings or other rotatable mounts.

It should further be appreciated that the axial shortness and compactness is further enhanced by the overfitting relation of housing 24 of the present invention with motor 96. Thus, utilizing the teachings of the present invention, brake 10 fits motor 96 snuggly to reduce the overall size of motor 96 and brake 10 and to reduce the spacing between motor 96 and machine 23. Likewise, the axial shortness and compactness is further enhanced by the overfitting relation of machine 23 with housing 24 of the present invention. Thus, utilizing the teachings of the present invention, brake 10 fits machine 23 snugly to reduce the overall size of brake 10 and machine 23 and to reduce the spacing between motor 96 and machine 23.

Additionally, it should be appreciated that utilizing mounting pads 90 for receiving axially extending bolts 98 threadably received into machine 23 according to the teachings of the present invention also allows housing 24 to have a reduced overall axial size than if housing 24 and/or motor 96 were independently mounted to the support to which machine 23 is mounted.

It should then be appreciated that the axial length of brake 10 is important in the degree of stress placed upon shaft 21 of motor 96 and upon the gears with which gear 23 mesh by hub 12. Specifically, the longer the length of housing 24, hub 12 has to be correspondingly longer to extend therethrough. Greater stress would then be placed upon the bearings of motor 96 and machine 23 which support shaft 21 and the machine gearing which in turn support hub 12 by the greater torque loading of the bearings created by the longer load transfer distances. Thus, the overall construction of the present invention is interdependent upon each of the components and results in a unique, synergistic result which is advantageous over prior control apparatuses.

Furthermore, aside from standard, stock parts, i.e., springs 64, torque pins 68, bolts 48, and the like, brake 10 includes only five operative parts which can be inexpensively formed and assembled. As set forth hereinbefore, hub 12 and friction disc 74 can be inexpensively cast and do not require the extensive machining required when splined connections are provided. Thus, hub 12 and friction disc 74 are relatively economical to manufacture.

Likewise, the particular configurations of plate 26, housing portion 28, and piston 50 is further believed to be advantageous over prior rotational control components. Specifically, each of the components are easy to manufacture and can be easily and rapidly assembled. Particularly, plate 26 by nature is circular and flat and thus can be readily and rapidly formed. Housing portion 28 and piston 50 are formed of relatively large annular portions including surfaces which can be rapidly and easily formed. For example, housing portion 28 does not include any small intricate angles or corners or axially internal cylindrical surfaces having larger dimensions than axially outer cylindrical surfaces. Further, housing portion 28 integrally includes and provides the mounting provisions of housing 24 without requiring extensive and expensive constructional features. Specifically, lip 49 can be easily cast or otherwise formed in housing portion 28 in a very economical manner. Additionally, forming housing portion 28 with a square outer shape creating mounting pads 90 for mounting apertures 32 allows inexpensive formation such as by casting without requiring forming and/or securement of mounting frames or other structures thereto. Thus, the described construction of plate 26, housing portion 28, and piston 50 is believed to be particularly advantageous over prior control apparatus constructions and especially in axially compact environments as in the case of the present invention.

Furthermore, to assemble brake 10 according to the teachings of the present invention, it is only necessary to drop friction disc 74 and piston 50 into cylindrical member 36 of housing portion 28 and to position and secure plate 26 within the recess defined by surface 92 of mounting pads 90. It can then be realized that since input hub 12 is not in any way supported by housing 24, input hub 12 can be inserted through opening 30, through piston 50, into aperture 80 and through opening 42 after assembly of housing 24 capturing piston 50 and friction disc 74. Thus, the described construction of brake 10 according to the teachings of the present invention is particularly advantageous over prior control apparatus constructions due to the ease of assembly of the present invention.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Brake for rotationally controlling a shaft of an electric motor for driving a machine, robot, or other apparatus component, with the machine, robot or other apparatus component including a base plate, with the base plate including a recess having a diameter, with the electric motor having a casing including an annular lip, with the electric motor having mounting flanges including axially extending mounting apertures, comprising, in combination: an air-chamber housing portion having a generally square outer perimeter including corners, with the air-chamber housing portion including a radially oriented, annular disc and a generally axially extending, cylindrical member extending from a first face of the annular disc, with the generally axially extending, cylindrical member being integral with the radially oriented, annular disc, with the generally axially extending, cylindrical member including a first, annular portion having a first, interior cylindrical surface and including a second, annular portion having a second, interior cylindrical surface and a radial, annular surface having an outer diameter, with the first, annular portion being integral with the second, annular portion; mounting pads formed in the corners of the outer perimeter beyond the second, annular portion of the air-chamber housing portion, with the mounting pads including axially extending bores; an annular piston, with the piston including an annular portion having a radially extending interface surface, an axially extending annular flange extending from the radially extending interface surface of the annular portion, with the axially extending annular flange having an outer diameter defining a first surface of the piston, and a radially extending annular flange extending from the annular portion radially outward of the axially extending annular flange from the radially extending interface surface, with the radially extending annular flange having an outer diameter defining a second surface of the piston, with the first surface of the piston having a diameter complementary to and for slidable receipt within the first, interior cylindrical surface of the air-chamber housing portion and the second surface of the piston having a diameter complementary to and for slidable receipt within the second, interior cylindrical surface of the air-chamber housing portion, with a fluid pressure cylinder being formed and defined by the axially extending cylindrical member of the air-chamber housing portion and the piston for the receipt of fluid pressure therein for moving the piston in a first axial direction away from the radially oriented, annular disc of the air-chamber housing portion; a generally flat, annular plate having an axially extending aperture, a thickness, and an outer diameter equal to the outer diameter of the radial, annular surface of the air-chamber housing portion and the diameter of the recess of the machine, robot, or other apparatus component, with the annular plate abutting with and secured to the radial, annular surface of the second, annular portion of the air-chamber housing portion, with the mounting pads extending axially beyond the radial, annular surface of the second, annular portion of the air-chamber housing portion generally one half the thickness of the annular plate, with the mounting pads including a recess having an interior cylindrical surface having a diameter equal to the outer diameter of the radial, annular surface of the air-chamber housing portion for receiving the annular plate; torque pins extending between the annular plate and the piston for preventing the piston from rotating relative to the annular plate and to the air-chamber housing portion; axially extending coil springs extending between the annular plate and the piston for biasing the piston in the opposite axial direction towards the radially oriented, annular disc of the air-chamber housing portion; bolts extending through the mounting apertures of the mounting flanges of the motor and through the axially extending bores of the mounting pads of the air-chamber housing portion and threadably secured into the base plate of the machine, robot, or other apparatus component for mounting the electric motor to the base plate of the machine, robot, or other apparatus component with the air-chamber housing being sandwiched between and supported by the electric motor and the base plate; an input hub attached to and supported by the shaft of the electric motor and independent of the air-chamber housing portion, with the input hub including means for driving the machine, robot or other apparatus component, with the air-chamber housing portion being independent of the input hub, with the input hub being rotatable within the air-chamber housing portion; an interface member slidably mounted but rotatable with the input hub, with the interface member being capturable between the radially oriented, annular disc of the air-chamber housing portion and the radially extending interface surface of the piston for interfacing between the first face of the radially oriented, annular disc of the air-chamber housing portion and the input hub; a lip located on the radially oriented, annular disc opposite to its first face forming a pilot rabbet motor mount for receipt on the annular lip of the casing of the electric motor for insuring that the air-chamber housing portion is centrally and concentrically located with respect to the motor casing and to prevent radial movement between the air-chamber housing portion and the electric motor casing, with the independence of the input hub and the air-chamber housing portion from each other permitting the brake to be axially compact allowing the machine, robot or other apparatus component to be located closely adjacent to the electric motor and preventing a significant increase in the stress load placed upon the shaft of the electric motor due to its support of the input hub.

2. The brake of claim 1 wherein the input hub includes a first axial portion having a hexagonal cross sectional outer surface; wherein the interface member comprises a friction disc including an aperture having a hexagonal shape which is complementary to and for slidable receipt on the hexagonal outer surface of the input hub allowing the friction disc to be slidably mounted to the input hub but rotatable therewith without requiring the extensive fabrication steps required in splined type connections.

3. Brake for rotationally controlling a shaft of a power source for driving a machine, robot, or other apparatus component, with the machine, robot or other apparatus component including a base plate, comprising, in combination: an air-chamber housing portion, with the air-chamber housing portion including a radially oriented, annular disc and a generally axially extending, cylindrical member extending from a first face of the annular disc, with the generally axially extending, cylindrical member being integral with the radially oriented, annular disc, with the generally axially extending, cylindrical member including a first, annular portion having a first, interior cylindrical surface and including a second, annular portion having a second, interior cylindrical surface, with the first, annular portion being integral with the second, annular portion; a piston including a first surface having a diameter complementary to and for slidable receipt within the first, interior cylindrical surface of the air-chamber housing portion and a second surface having a diameter complementary to and for slidable receipt within the second, interior cylindrical surface of the air-chamber housing portion, with a fluid pressure cylinder being formed and defined by the axially extending cylindrical member of the air-chamber housing portion and the piston for the receipt of fluid pressure therein for moving the piston in a first axial direction; means for biasing the piston in the opposite axial direction; means for mounting the power source to the base plate of the machine, robot, or other apparatus component with the air-chamber housing being sandwiched between and supported by the power source and the base plate; an input hub attached to and supported by the shaft of the power source and independent of the air-chamber housing portion, with the input hub including means for driving the machine, robot or other apparatus component, with the air-chamber housing portion being independent of the input hub, with the input hub being rotatable within the air-chamber housing portion; means for interfacing between the first face of the radially oriented, annular disc of the air-chamber housing portion and the input hub, with the interface means being slidably mounted to the input hub but rotatable therewith, with the independence of the input hub and the air-chamber housing portion from each other permitting the brake to be axially compact allowing the machine, robot or other apparatus component to be located closely adjacent to the power source and preventing a significant increase in the stress load placed upon the shaft of the power source due to its support of the input hub.

4. The brake of claim 3 wherein the input hub includes a first axial portion having a hexagonal cross sectional outer surface; wherein the interface means comprises a friction disc including an aperture having a hexagonal shape which is complementary to and for slidable receipt on the hexagonal outer surface of the input hub allowing the friction disc to be slidably mounted to the input hub but rotatable therewith without requiring the extensive fabrication steps required in splined type connections.

5. The brake of claim 3 wherein the air-chamber housing portion has a square outer perimeter having corners and wherein the mounting means comprises, in combination: mounting pads formed in the corners of the outer perimeter beyond the second, annular portion of the air-chamber housing portion, with the mounting pads including axially extending bores for receipt of bolts threadably secured into the base plate of the machine, robot, or other apparatus component.

6. The brake of claim 5 wherein the power source includes mounting flanges including axially extending mounting apertures; and wherein the mounting means comprises, in combination: bolts extending through the mounting apertures of the mounting flanges of the power source and through the axially extending bores of the mounting pads of the air-chamber housing portion and threadably secured into the base plate of the machine, robot, or other apparatus component.

7. The brake of claim 5 wherein the second, annular portion of the air-chamber housing portion further includes a radial, annular surface having an outer diameter; wherein the brake further comprises, in combination: a generally flat, annular plate having an axially extending aperture, a thickness, and an outer diameter equal to the outer diameter of the radial, annular surface of the air-chamber housing portion, with the annular plate abutting with and secured to the radial, annular surface of the second, annular portion of the air-chamber housing portion.

8. The brake of claim 7 wherein the base plate of the machine, robot, or other apparatus component includes a recess having a diameter generally equal to and for receipt of the annular plate, with the receipt of the annular plate into the recess of the base plate insuring that the air-chamber housing portion secured to the annular plate is centrally and concentrically located with respect to the base plate and to prevent radial movement between the air-chamber housing portion and the base plate of the machine, robot, or other apparatus component.

9. The brake of claim 8 wherein the recess of the base plate has an axial depth greater than one-half the thickness of the annular plate; wherein the mounting pads axially extend beyond the radial, annular surface of the second, annular portion of the air-chamber housing portion generally one half the thickness of the annular plate, with the mounting pads including a recess having an interior cylindrical surface having a diameter equal to the outer diameter of the radial, annular surface of the air-chamber housing portion for receiving the annular plate, with the mounting pads abutting with the base plate of the machine, robot, or other apparatus component radially outward of the recess of the base plate to prevent axial movement of the air-chamber housing portion in a direction towards the base plate of the machine, robot, or other apparatus component.

10. The brake of claim 7 further comprising, in combination: torque pins extending between the annular plate and the piston for preventing the piston from rotating relative to the annular plate and to the air-chamber housing portion; wherein the biasing means comprises axially extending coil springs extending between the annular plate and the piston.

11. The brake of claim 3 wherein the piston comprises, in combination: an annular portion having a radially extending interface surface; an axially extending annular flange extending from the radially extending interface surface of the annular portion, with the axially extending annular flange having an outer diameter defining the first surface of the piston; and a radially extending annular flange extending from the annular portion radially outward of the axially extending annular flange from the radially extending interface surface, with the radially extending annular flange having an outer diameter defining the second surface of the piston.

12. The brake of claim 11 wherein the interfacing means comprises, in combination: an interface member slidably mounted but rotatable with the input hub, with the interface member being capturable between the radially oriented, annular disc of the air-chamber housing portion and the radially extending interface surface of the piston.

13. The brake of claim 3 wherein the power source comprises an electric motor having a casing; and wherein the brake further comprises, in combination: means for interlocking the air-chamber housing portion to the casing of the electric motor independent of the shaft and the input hub.

14. The brake of claim 13 wherein the casing of the electric motor includes an annular lip; and wherein the electric motor casing interlocking means comprises, in combination: a lip located on the radially oriented, annular disc opposite to its first face forming a pilot rabbet motor mount for receipt on the annular lip of the casing of the electric motor for insuring that the air-chamber housing portion is centrally and concentrically located with respect to the motor casing and to prevent radial movement between the air-chamber housing portion and the electric motor casing.

15. Brake for rotationally controlling a shaft of a power source for driving a machine, robot, or other apparatus component, with the machine, robot or other apparatus component including a base plate, comprising, in combination: an air-chamber housing portion; an annular piston complementary to and for slidable receipt within the air-chamber housing portion, with the piston comprising, in combination: an annular portion having a radially extending interface surface and a radially extending annular flange extending radially outward from the annular portion, with a fluid pressure cylinder being formed and defined by the air-chamber housing portion and the piston for the receipt of fluid pressure therein for moving the piston in a first axial direction; means for biasing the piston in the opposite axial direction; an annular plate having an axially extending aperture, having first and second generally flat surfaces defining a thickness, and having an outer diameter, with the annular plate secured to a radial, annular surface of the air-chamber housing portion with the first surface of the annular plate abutting with the radial, annular surface of the air-chamber housing, with the first and second surfaces being generally parallel to the radially extending interface surface of the piston, with the annular portion and the radially extending annular flange of the piston abutting with the first surface of the annular plate when moved in the first axial direction by the receipt of fluid pressure in the fluid pressure cylinder; wherein the base plate of the machine, robot, or other apparatus component includes a recess having a diameter generally equal to and for receipt of the annular plate, with the receipt of the annular plate into the recess of the base plate insuring that the air-chamber housing portion secured to the annular plate is centrally and concentrically located with respect to the base plate and to prevent radial movement between the air-chamber housing portion and the base plate of the machine, robot, or other apparatus component; an input hub attached to and supported by the shaft of the power source, with the input hub including means for driving the machine, robot or other apparatus component, with the input hub being rotatable within the air-chamber housing portion; and means for interfacing between the air-chamber housing portion and the input hub.

16. Brake for rotationally controlling a shaft of a power source for driving a machine, robot, or other apparatus component, with the machine, robot or other apparatus component including a base plate, comprising, in combination: an air-chamber housing portion; an annular piston complementary to and for slidable receipt within the air-chamber housing portion, with a fluid pressure cylinder being formed and defined by the air-chamber housing portion and the piston for the receipt of fluid pressure therein for moving the piston in a first axial direction; means for biasing the piston in the opposite axial direction; mounting pads formed on the air-chamber housing portion, with the mounting pads including axially extending bores for receipt of bolts threadably secured into the base plate of the machine, robot, or other apparatus component; an annular plate having an axially extending aperture, a thickness, and an outer diameter, with the annular plate abutting with and secured to a radial, annular surface of the air-chamber housing portion; wherein the base plate of the machine, robot, or other apparatus component includes a recess having a diameter generally equal to and for receipt of the annular plate, with the receipt of the annular plate into the recess of the base plate insuring that the air-chamber housing portion secured to the annular plate is centrally and concentrically located with respect to the base plate and to prevent radial movement between the air-chamber housing portion and the base plate of the machine, robot, or other apparatus component; wherein the recess of the base plate has an axial depth greater than one-half the thickness of the annular plate; wherein the mounting pads axially extend beyond the radial, annular surface of the air-chamber housing portion generally one half the thickness of the annular plate, with the mounting pads including a recess having an interior cylindrical surface having a diameter equal to the outer diameter of the radial, annular surface of the air-chamber housing portion for receiving the annular plate, with the mounting pads abutting with the base plate of the machine, robot, or other apparatus component radially outward of the recess of the base plate to prevent axial movement of the air-chamber housing portion in a direction towards the base plate of the machine, robot, or other apparatus component; an input hub attached to and supported by the shaft of the power source, with the input hub including means for driving the machine, robot or other apparatus component, with the input hub being rotatable within the air-chamber housing portion; and means for interfacing between the air-chamber housing portion and the input hub.

* * * * *